(12) United States Patent
Akkaraju

(10) Patent No.: US 12,294,761 B2
(45) Date of Patent: *May 6, 2025

(54) DISTRIBUTING DIGITAL CINEMA PACKAGE (DCP) OVER INTERNET

(71) Applicant: SR Labs, Inc., West Hollywood, CA (US)

(72) Inventor: Prem Akkaraju, Los Angeles, CA (US)

(73) Assignee: SR LABS, INC., West Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/368,853

(22) Filed: Sep. 15, 2023

(65) Prior Publication Data

US 2024/0015360 A1 Jan. 11, 2024

Related U.S. Application Data

(63) Continuation of application No. 18/318,490, filed on May 16, 2023, now Pat. No. 12,120,383, which is a
(Continued)

(51) Int. Cl.
*H04N 21/4367* (2011.01)
*H04N 21/435* (2011.01)

(52) U.S. Cl.
CPC ..... *H04N 21/4367* (2013.01); *H04N 21/4353* (2013.01)

(58) Field of Classification Search
CPC ........... H04N 21/4367; H04N 21/4353; H04N 21/2541; H04N 21/235; H04N 21/42684
See application file for complete search history.

(56) References Cited

U.S. PATENT DOCUMENTS

| 11,695,983 B2 | 7/2023 | Akkaraju |
| 11,849,175 B2 | 12/2023 | Akkaraju |

(Continued)

FOREIGN PATENT DOCUMENTS

| AU | 2021332493 | 5/2024 |
| CN | 105100959 | 11/2015 |

(Continued)

OTHER PUBLICATIONS

"U.S. Appl. No. 18/318,490, Non Final Office Action mailed May 1, 2024", 28 pgs.

(Continued)

*Primary Examiner* — Joshua D Taylor
(74) *Attorney, Agent, or Firm* — SCHWEGMAN LUNDBERG & WOESSNER, P.A.

(57) ABSTRACT

Disclosed are systems, methods, and non-transitory computer-readable media for distributed DCP over internet. A client-side digital content delivery device receives a digital cinema package (DCP) for a digital movie from a remote digital content delivery system. The DCP includes a unique digital watermark applied by the content delivery system. In response to receiving an input to cause playback of the digital movie, the client-side digital content delivery device compares a unique device identifier for a display device paired to the client-side digital content delivery device to an authorized unique identifier. If the unique device identifier matches the authorized unique identifier, the client-side digital content delivery device uses the DCP to causes presentation of the digital movie by the display device paired to the client-side digital content delivery device.

12 Claims, 8 Drawing Sheets

Related U.S. Application Data continuation of application No. 17/202,694, filed on Mar. 16, 2021, now Pat. No. 11,849,175, which is a continuation of application No. 17/008,134, filed on Aug. 31, 2020, now Pat. No. 11,695,983.

(56) References Cited

U.S. PATENT DOCUMENTS

| | | |
|---|---|---|
| 12,120,383 B2 | 10/2024 | Akkaraju |
| 2004/0064702 A1 | 4/2004 | Yu et al. |
| 2004/0081318 A1 | 4/2004 | Bilobrov et al. |
| 2009/0210915 A1 | 8/2009 | Millman et al. |
| 2014/0372759 A1 | 12/2014 | Ramachandran et al. |
| 2016/0057466 A1 | 2/2016 | Kumar et al. |
| 2017/0163839 A1 | 6/2017 | Arana et al. |
| 2019/0130136 A1 | 5/2019 | Claypool et al. |
| 2019/0207949 A1 | 7/2019 | Parker et al. |
| 2020/0275114 A1 | 8/2020 | Radford |
| 2022/0070520 A1 | 3/2022 | Akkaraju |
| 2022/0070521 A1 | 3/2022 | Akkaraju |
| 2023/0291960 A1 | 9/2023 | Akkaraju |

FOREIGN PATENT DOCUMENTS

| | | |
|---|---|---|
| CN | 116325758 | 11/2024 |
| EP | 3477952 | 5/2019 |
| JP | 2023542750 | 10/2023 |
| JP | 7398600 | 12/2023 |
| WO | 2005101837 | 10/2005 |
| WO | 2022047408 | 3/2022 |

OTHER PUBLICATIONS

"U.S. Appl. No. 18/318,490, Response filed May 3, 2024 to Non Final Office Action mailed May 1, 2024", 10 pgs.
"Chinese Application Serial No. 202180052757.3, Office Action mailed May 9, 2024", with English translation, 7 pages.
U.S. Appl. No. 17/008,134 U.S. Pat. No. 11,695,983, filed Aug. 31, 2020, Distributing Digital Cinema Package (DCP) Over Internet.
U.S. Appl. No. 17/202,694, filed Mar. 16, 2021, Distributing Digital Cinema Package (DCP) Over Internet.
U.S. Appl. No. 18/318,490, filed May 16, 2023, Distributing Digital Cinema Package (DCP) Over Internet.
"Chinese Application Serial No. 202180052757.3, Office Action mailed Nov. 30, 2023", with English translation, 20 pages.
"U.S. Appl. No. 17/008, 134, Non Final Office Action mailed Mar. 12, 2021", 14 pgs.
"U.S. Appl. No. 17/008, 134, Examiner Interview Summary mailed Apr. 23, 2021", 2 pgs.
"U.S. Appl. No. 17/008, 134, Response filed Apr. 29, 2021 to Non Final Office Action mailed Mar. 12, 2021", 11 pgs.
"U.S. Appl. No. 17/008, 134, Final Office Action mailed May 19, 2021", 17 pgs.
"U.S. Appl. No. 17/008, 134, Response filed Jul. 28, 2021 to Final Office Action mailed May 19, 2021", 12 pgs.
"U.S. Appl. No. 17/008, 134, Examiner Interview Summary mailed Aug. 2, 2021", 2 pgs.
"U.S. Appl. No. 17 008,134, Non Final Office Action mailed Oct. 25, 2021".
"International Application Serial No. PCT US2021 048508, International Search Report mailed Nov. 17, 2021", 4 pgs.
"International Application Serial No. PCT US2021 048508, Written Opinion mailed Nov. 17, 2021", 5 pgs.
"U.S. Appl. No. 17/008,134, Response filed Feb. 7, 2022 to Non Final Office Action mailed Oct. 25, 2021", 11 pgs.
"U.S. Appl. No. 17/008,134, Final Office Action mailed Mar. 16, 2022", 23 pgs.
"U.S. Appl. No. 17/202,694, Non Final Office Action mailed Mar. 16, 2022", 19 pgs.
"U.S. Appl. No. 17/008,134, Response filed May 3, 2022 to Final Office Action mailed Mar. 16, 2022", 10 pgs.
"U.S. Appl. No. 17/202,694, Response filed May 3, 2022 to Non Final Office Action mailed Mar. 16, 2022", 11 pgs.
"U.S. Appl. No. 17/008,134, Examiner Interview Summary mailed May 6, 2022", 2 pgs.
"U.S. Appl. No. 17/202,694, Examiner Interview Summary mailed May 6, 2022", 2 pgs.
"U.S. Appl. No. 17/202,694, Final Office Action mailed Jul. 13, 2022", 21 pgs.
"U.S. Appl. No. 17/008,134, Non Final Office Action mailed Sep. 1, 2022", 22 pgs.
"U.S. Appl. No. 17/202,694, Response filed Sep. 6, 2022 to Final Office Action mailed Jul. 13, 2022", 11 pgs.
"U.S. Appl. No. 17/008,134, Response filed Dec. 1, 2022 to Non Final Office Action mailed Sep. 1, 2022", 13 pgs.
"U.S. Appl. No. 17/202,694, Non Final Office Action mailed Dec. 7, 2022", 26 pgs.
"U.S. Appl. No. 17/008, 134, Final Office Action mailed Feb. 2, 2023", 27 pgs.
"International Application Serial No. PCT US2021 048508, International Preliminary Report on Patentability mailed Mar. 9, 2023", 7 pgs.
"U.S. Appl. No. 17/008,134, Response filed Mar. 10, 2023 to Final Office Action mailed Feb. 2, 2023", 15 pgs.
"U.S. Appl. No. 17/008,134, Examiner Interview Summary mailed Mar. 16, 2023", 2 pgs.
"U.S. Appl. No. 17/202,694, Response filed Mar. 28, 2023 to Non Final Office Action mailed Dec. 7, 2022", 13 pgs.
"U.S. Appl. No. 17/008,134, Notice of Allowance mailed Mar. 29, 2023", 9 pgs.
"U.S. Appl. No. 17/008,134, Notice of Allowability mailed May 15, 2023", 2 pgs.
"U.S. Appl. No. 17/202,694, Final Office Action mailed Jun. 23, 2023", 16 pgs.
"U.S. Appl. No. 17/202,694, Response filed Jul. 19, 2023 to Final Office Action mailed Jun. 23, 2023", 7 pgs.
"U.S. Appl. No. 17/202,694, Notice of Allowance mailed Aug. 7, 2023", 8 pgs.
"European Application Serial No. 21790637.9, Response to Communication pursuant to Rules 161(1) and 162 EPC filed Sep. 15, 2023", 19 pgs.
"Australian Application Serial No. 2021332493, First Examination Report mailed Aug. 18, 2023", 3 pgs.
"Korean Application Serial No. 10-2023-7011154, Notice of Preliminary Rejection mailed Sep. 11, 2023", with English translation, 6 pages.
"U.S. Appl. No. 17/202,694, Corrected Notice of Allowability mailed Nov. 14, 2023", 2 pgs.
"U.S. Appl. No. 18/318,490, Notice of Allowance mailed Jun. 14, 2024", 9 pages.
"U.S. Appl. No. 18/318,490, Corrected Notice of Allowability mailed Jun. 27, 24", 2 pages.
"Korean Application Serial No. 10-2023-7011154, Response filed Nov. 2, 2023 to Notice of Preliminary Rejection mailed Sep. 11, 2023", with English claims, 24 pages.
"Australian Application Serial No. 2024200660, First Examination Report mailed Jan. 20, 2025", 2 pages.
"European Application Serial No. 21790637.9, Communication Pursuant to Article 94(3) EPC mailed Feb. 26, 2025", 7 pages.
"Digital Cinema System Specification v.3.01", Digital Cinema Initiatives, LLC Technology Committee, XP017205135, (Feb. 13, 2004), 157 pages.

DISTRIBUTING DIGITAL CINEMA PACKAGE (DCP) OVER INTERNET

CLAIM OF PRIORITY

This application is a continuation of U.S. patent application Ser. No. 18/318,490 filed May 16, 2023, which is a continuation of U.S. patent application Ser. No. 17/202,694, filed Mar. 16, 2021, which is a continuation of U.S. patent application Ser. No. 17/008,134, filed Aug. 31, 2020, and issued as U.S. Pat. No. 11,695,983 on Jul. 4, 2023, all of which applications are hereby incorporated by reference in their entireties.

TECHNICAL FIELD

An embodiment of the present subject matter relates generally to digital cinema packages (DCPs) and, more specifically, to distributed DCP over internet.

BACKGROUND

Traditionally, movie theatres presented movies using traditional film projectors. With advances in digital technology, however, many theaters have begun presenting films using digital projectors. Digital versions of movies are transcoded into Digital Cinema Packages (DCPs) that provide a standardized format for presenting digital movies. Currently, copies of DCP movies are stored onto physical storage devices, such as CRU drives, that are delivered to movie theatres around the world in rugged shipping cases known as DCP kits. This process, however, is both expensive and slow. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
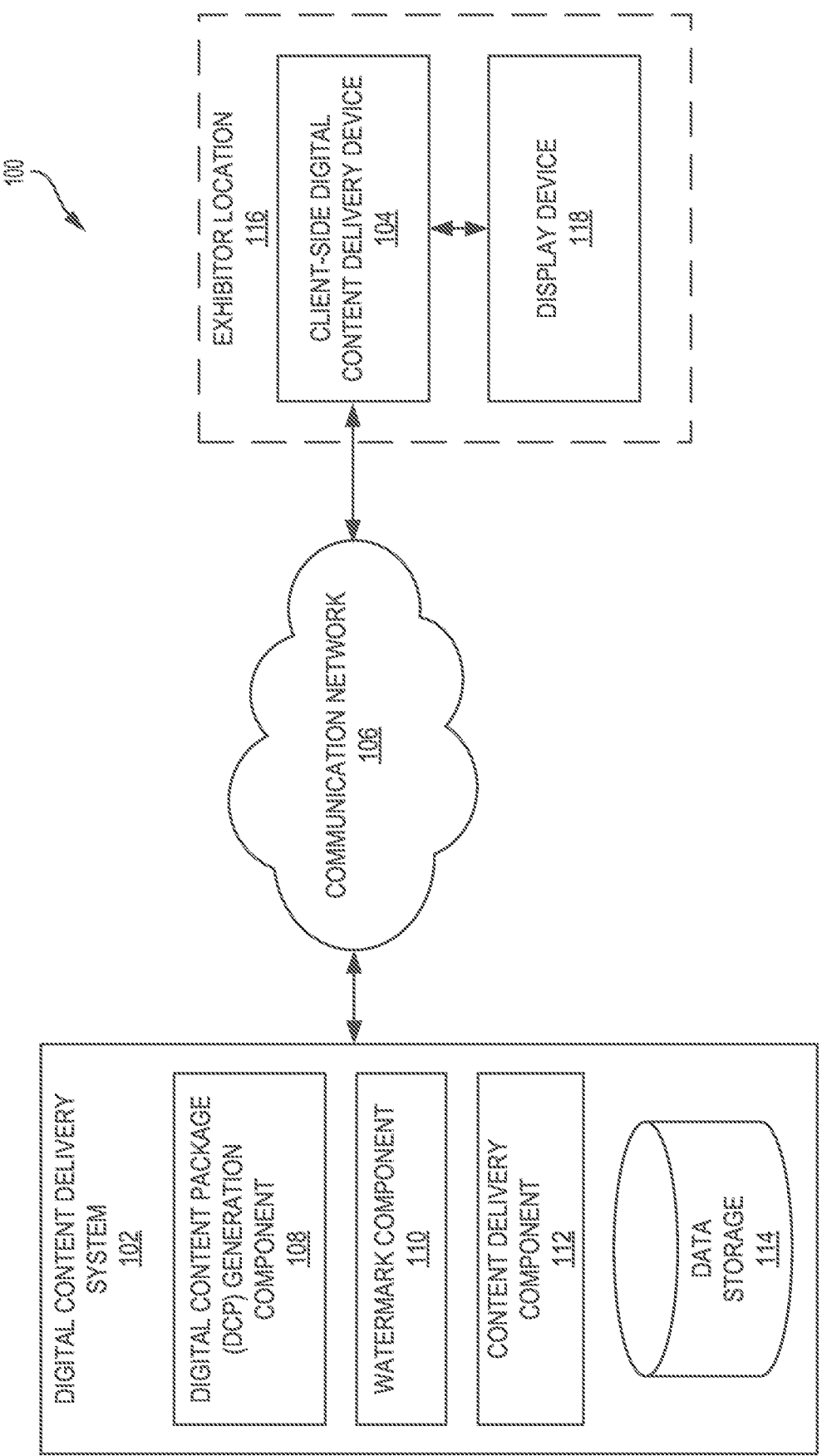
FIG. 1 shows an example system for distributed DCP over internet, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and computer-readable storage media for distributed DCP over internet. Currently, digital movies are delivered to movie theatres (e.g., exhibitor locations) as a DCP in a physical format. For example, a digital movie is transcoded into a DCP and stored onto physical storage devices, such as CRU drives, which are delivered to movie theatres in rugged shipping cases known as DCP kits. This process provides a way to control and track the digital copies of the movies as each copy of the DCP is restricted to its physical storage device. While use of physical storage devices to store and deliver DCPs provides some benefits, it also has drawbacks as the process of creating and delivering the DCPs is expensive and time consuming.

To alleviate these issues, a client-side digital content delivery device is used to distribute DCP over the internet to multiple exhibitor locations. An exhibitor location may be a physical location at which an exhibitor provides viewings of digital movies. For example, an exhibitor location may be a movie theater that is licensed to present the digital movie to audiences. The client-side digital content delivery device is a physical hardware device that is configured to interface with a communication network (e.g., internet) to receive a DCP from a remote digital content delivery system. The client-side digital content delivery device can be physically connected to a display device (e.g., digital projector) using a connector such as a cable, and cause presentation of the DCP by the display device. For example, a client-side digital content delivery device may be a set-top box with internet connection capabilities that can be physically connected to a digital movie projector located at a movie theatre. A client-side digital content delivery device may be allocated to each authorize exhibitor and/or exhibitor location for the purposes of distributing DCP over the internet rather than through the current use of storage devices.

When using a client-side digital content delivery devices to distribute DCP over the internet, several security features can be implemented to prevent and track misuse of the digital movie. For example, digital watermarks may be applied to each DCP to allow the source of a misused digital movie to be easily determined. A digital watermark is a type of marker that is embedded into audio, video and/or image data. The digital watermark may include data identifying the DCP to which it is applied. For example, a digital content management system may apply a digital watermark including a unique identifier that identifies the exhibitor and/or client-side digital content delivery device to which the DCP is being transmitted. If a misused version of the digital movie is found, such as a pirated version of the digital movie, the digital watermark applied to the digital movie may be used to identify the exhibitor and/or digital content delivery device to which the DCP was allocated.

A client-side digital watermark can be also be applied to each presentation of the DCP to provide additional information regarding the source of a pirated version of a digital movie. For example, the client-side digital content delivery device may apply a client-side digital watermark to the DCP prior to causing presentation of the DCP. The client-side digital watermark can include session data describing the specific presentation of the digital movie, such as the presentation time, theatre number, and the like.

Encryption may also be used to prevent misuse of the digital movie. For example, the digital content management system may encrypt the DCP prior to transmission to the client-side digital content delivery device. The digital content management system may provide the client-side digital content delivery device with a key used to decrypt the DCP to cause playback. For example, the digital content management system may provide the client-side digital content delivery device with a key delivery message (KDM) that can be used to decrypt the DCP.

As another security feature, the client-side digital content delivery device may be restricted to use with authorized display devices. For example, each client-side digital content delivery device allocated to an exhibitor, such as a movie theatre, may be configured to operate with a specified set of display devices, such as a set of digital projectors used by the exhibitor. Each client-side digital content delivery device may be loaded with a set of one or more authenticated unique identifiers that identify the authorized display devices. Prior to initiating presentation of a DCP, the client-side digital content delivery device accesses a unique device identifier from the display device paired to the client-side digital content delivery device to determine whether the display device is an authorized display device. For example, the client-side digital content delivery device compares the unique device identifier accessed from the paired display device to the authenticated unique identifiers maintained by the client-side digital content delivery device.

FIG. 1 shows an example system 100 for distributed DCP over internet, according to some example embodiments. As shown, multiple devices (e.g., digital content delivery system 102 and client-side digital content delivery device 104) are connected to a communication network 106 and configured to communicate with each other through use of the communication network 106. The communication network 106 is any type of network, including a local area network (LAN), such as an intranet, a wide area network (WAN), such as the internet, or any combination thereof. Further, the communication network 106 may be a public network, a private network, or a combination thereof. The communication network 106 is implemented using any number of communication links associated with one or more service providers, including one or more wired communication links, one or more wireless communication links, or any combination thereof. Additionally, the communication network 106 is configured to support the transmission of data formatted using any number of protocols.

Multiple computing devices can be connected to the communication network 106. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 800 shown in FIG. 8.

To facilitate communication with other computing devices, a computing device includes a communication interface configured to receive a communication, such as a request, data, and the like, from another computing device in network communication with the computing device and pass the communication along to an appropriate component running on the computing device. The communication interface also sends a communication to another computing device in network communication with the computing device.

As shown, the digital content delivery system 102 communicates with a client-side digital content delivery device 104 located at an exhibitor location 116. The client-side digital content delivery device 104 is connected to a display device 118 located at the exhibitor location 116. Although the shown system 100 includes only one exhibitor location 116, client-side digital content delivery device 104 and display device 118, this is just for ease of explanation and is not meant to be limiting. The system 100 may include any number of exhibitor locations 116, client-side digital content delivery devices 104 and display devices 118. Accordingly, the digital content delivery system 102 may communicate with any number of client-side digital content delivery devices 104 located at various exhibitor locations 116 to provide a DCP. Similarly, an exhibitor location 116 may include multiple client-side digital content delivery devices 104 and/or display devices 118.

The digital content delivery system 102 is one or more computing devices configured generate DCPs of digital movies and provide the DCP to an exhibitor location 116 over the internet (e.g., via the communication network 106). A DCP is a collection of digital files used to store and convey digital cinema audio, image, and data streams. For example, a DCP consists of all the files that make up a digital film, such as the the picture, sound, subtitles, and related information that ensures that the digital movie is presented correctly.

The digital content delivery system 102 includes a DCP generation component 108 configured to generate a DCP of a digital movie. For example, the DCP generation component transcodes the digital movie based on the standardized DCP format. The DCP generation component 108 may store a generated DCP in the data storage 114, where it may be accessed by the other components of the digital content delivery system 102.

The watermark component 110 applies a digital watermark (e.g., forensic watermark) to a copy of the DCP that will be transmitted to an exhibitor location 116. A digital watermark is a type of marker that is embedded into audio, video and/or image data. The digital watermark may include data used to identify the specific copy of the DCP to which it is applied. For example, the watermark component 110 may apply a digital watermark to the DCP that includes a unique identifier that identifies the exhibitor, exhibitor location 116, and/or client-side digital content delivery device 104 to which the DCP is being transmitted. Accordingly, the DCP of a digital movie provided to different exhibitor locations 116 may be embedded with different digital watermarks that identify the specific exhibitor, exhibitor location 116, and/or digital content delivery device 104. If a misused version of the digital movie is found, such as a pirated version of the digital movie, the digital watermark applied to the digital movie can be used to identify the exhibitor, exhibitor location 116 and/or digital content delivery device 104 to which the DCP of the digital movie was provided.

The unique identifiers associated with each exhibitor location 116 and/or client-side digital content delivery device 104 may be stored in the data storage 114. Accordingly, the watermark component 110 may access the unique identifier for the exhibitor location 116 and/or client-side digital content delivery device 104 from the data storage 114. The watermark component 110 can then use the unique identifier to apply the digital watermark to the DCP.

The watermark component 110 may provide the copy of the DCP that has been embedded with the digital watermark to the content delivery component 112. The content delivery component 112 transmits the DCP to the client-side digital content delivery device 104 via the communication network 106. In this way, the digital content delivery system 102 can distribute DCPs to multiple remote exhibitor locations 116 via a communication network 106 such as the internet rather than through the traditional method of shipping physical copies of the DCP.

In some embodiments, the content delivery component 112 may encrypt the DCP prior to transmission to the client-side digital content delivery device 104. For example, the content delivery component 112 may encrypt the DCP using an encryption key or algorithm that results in an encrypted DCP that can be decrypted using a corresponding key or algorithm by the receiving client-side digital content delivery device 104. The key or algorithm used to decrypt the DCP may be allocated to the client-side digital content delivery device 104 prior to transmission of the DCP. For example, the key or algorithm may be provided to the client-side digital content delivery device 104 as a key delivery message (KDM).

The client-side digital content delivery device 104 is a physical hardware device that is configured to interface with the communication network 106 to communicate with remote computing systems. The client-side digital content delivery device 104 can also be physically connected to a display device 118 using a physical connector such as a cable, and cause presentation of a DCP by the display device 118. For example, the client-side digital content delivery device 104 may be a set-top box with internet connection capabilities that also include appropriate ports to be physically connected to a display device 118 (e.g., digital movie projector) located at an exhibitor location 116 (e.g., movie theatre).

The client-side digital content delivery device 104 receives the DCP from the digital content delivery system 102 via the communication network 106 and stores the DCP in a data storage from where it can be accessed. For example, the client-side digital content delivery device 104 may access the DCP from the data storage to cause presentation of the DCP by a display device 118 that is physically paired to the client-side digital content delivery device 104. A display device 118 may be any type of device that is configured to present a digital movie, such as a digital projector, television, and the like. The display device 118 may be paired to the client-side digital content delivery device 104 via a physical connector, such as a cable.

The client-side digital content delivery device 104 may be configured to perform several functions to provide security against misuse of the digital movie. For example, the client-side digital content delivery device 104 can be configured to decrypt the DCP prior to presentation, apply a client-side digital watermark that includes session specific data, as well as ensure that the display device 118 is an authorize display device 118. The functionality of the client-side digital content delivery device 104 is described in greater detail in relation to FIG. 2.

Figure 2:
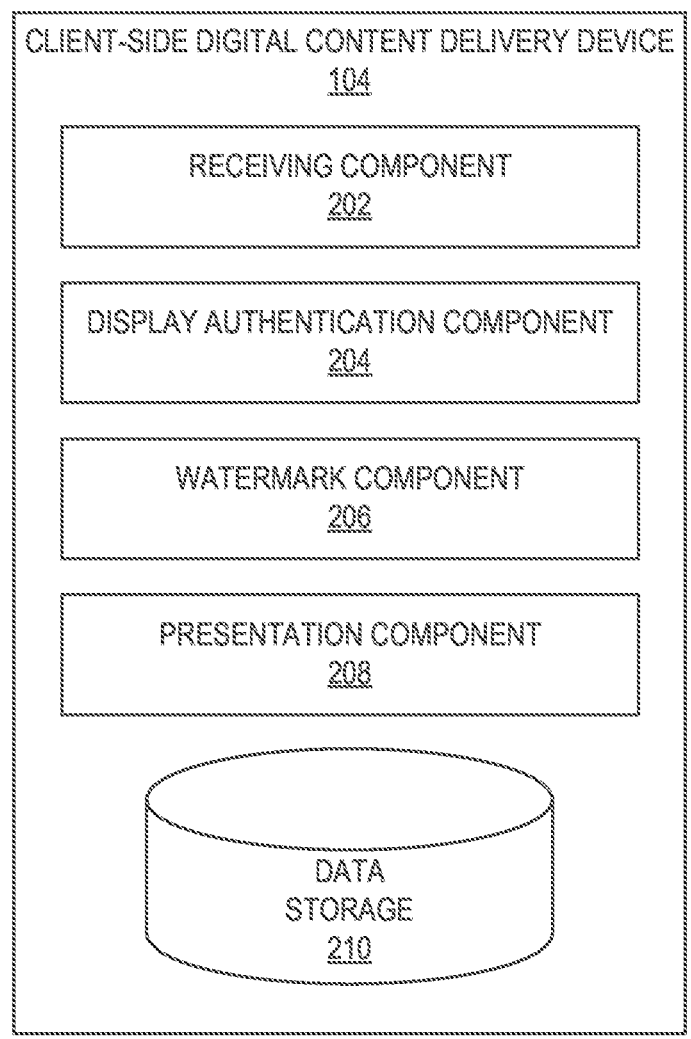
FIG. 2 is a block diagram of a client-side digital content delivery device, according to some example embodiments.

FIG. 2 is a block diagram of a client-side digital content delivery device 104, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the client-side digital content delivery device 104 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the client-side digital content delivery device 104 includes a receiving component 202, a display authentication component 204, watermark component 206, a presentation component 208 and a data storage 210. The receiving component 202 is configured to receive a DCP from a digital content delivery system 102. The receiving component 202 may store the received DCP in the data storage 210 where it can be accessed by the other components of the client-side digital content delivery device 104.

The display authentication component 204 ensures that the display device 118 paired to the client-side digital content delivery device 104 is authorized to operate with the client-side digital content delivery device 104. As a security feature, each client-side digital content delivery device 104 may be restricted to use with one or more authorized display devices 118. For example, each client-side digital content delivery device 104 allocated to an exhibitor location 116 may be configured to operate with a specified set of display devices 118, such as a set of digital projectors located at the exhibitor location 116. Each client-side digital content delivery device 104 may be loaded with a set of one or more authenticated unique identifiers that identify the authorized display devices 118. For example, the authorized unique identifiers may be stored in the data storage 114.

The display authentication component 204 uses the authorized unique identifiers to ensure that the display device 118 is authorized for use with the client-side digital content delivery device 104. For example, prior to initiating presentation of a DCP, the display authentication component 204 accesses a unique device identifier from the display device 118 paired to the client-side digital content delivery device 118. The display authentication component 204 may access the unique identifier by transmitting a request to the display device 118 for the unique identifier, which the display device 118 may return in response.

The display authentication component 204 uses the received unique identifier to determine whether the display device 118 is authorized for use with the client-side digital content delivery device 104. For example, the display authentication component 204 compares the unique device identifier received from the paired display device 118 to the authenticated unique identifiers stored in the data storage 114.

If the unique identifier accessed from the paired display device 118 does not match one of the authorized unique identifiers, the display authentication component 204 determines that the display device 118 is not authorized for use with the client-side digital content delivery device 104. In this type of situation, the display authentication component 204 may prohibit the client-side digital content delivery device 104 from causing presentation of the digital movie by the display device 118.

Alternatively, if the unique identifier accessed from the paired display device 118 matches one of the authorized unique identifiers, the display authentication component 204 determines that the display device 118 is authorized for use with the client-side digital content delivery device 104. In this situation, the display authentication component 204 may communicate with the other components of the client-side digital content delivery device 104 to cause presentation of the digital movie by the display device 118. For example, the display authentication component 204 may communicate with the watermark component 206 and/or the presentation component 208.

The watermark component 206 applies a client-side digital watermark to the digital movie prior to presentation of the digital movie by the display device 118. The client-side digital watermark may include session data that uniquely identifies the individual presentation of the digital movie. For example, the session data may include data identifying the day/time of presentation, the specific theatre number, and the like.

The presentation component 208 causes presentation of the digital movie by the display device 118. For example, the presentation component 208 may stream the digital movie to the display device 118. The presentation component 208 may also decrypt the DCP if needed, such as by using a key delivery message (KDM).

Figure 3:
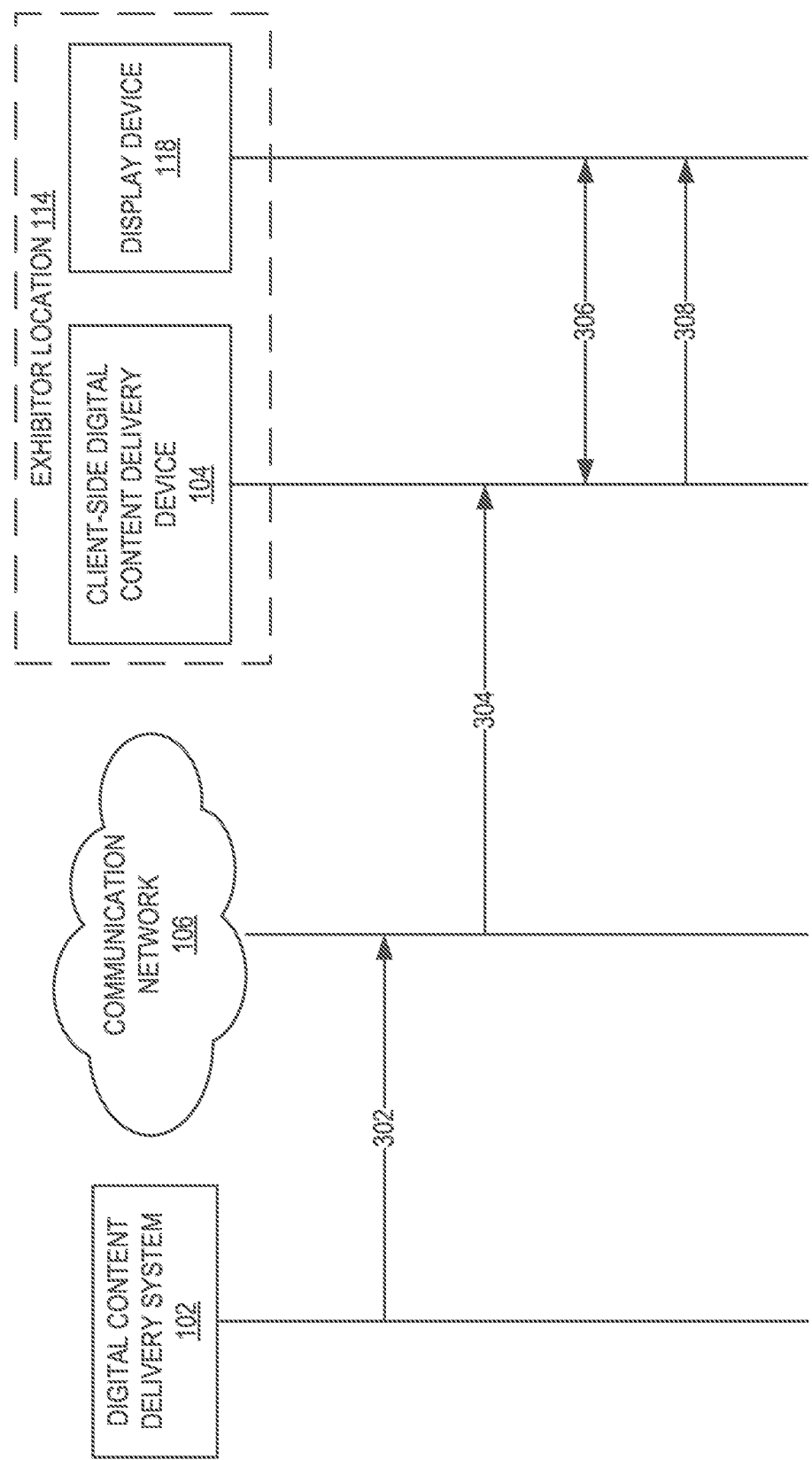
FIG. 3 shows communications within a system for distributed DCP over internet, according to some example embodiments.

FIG. 3 shows communications within a system for distributed DCP over internet, according to some example embodiments. As shown, the digital content delivery system 102 provides a DCP to an exhibitor location 116 via a communication network 106. For example, the digital content delivery system 102 communicates 302 with the commination network 106 to cause the DCP to be transmitted 304 to the client-side digital content delivery device 104 located at the exhibitor location 116. As discussed previously, the DCP transmitted to the exhibitor location 116 may be encrypted and/or embedded with a digital watermark that identifies the exhibitor, exhibitor location 116, and/or the client-side digital content delivery device 104.

The client-side digital content delivery device 104 can use the received DCP to cause presentation of a digital movie by the display device 118. This may include decrypting the DCP and/or applying a client-side digital watermark to the DCP prior to causing presentation by the display device 118.

The client-side digital content delivery device 104 may also ensure that the display device 118 that is paired to the client-side digital content delivery device 104 is authorized to operate with the client-side digital content delivery device 104. For example, the client-side digital content delivery device 104 communicates 306 with the display device 118 (e.g., transmits a request to the display device 118 and receives a response to the request) to access a unique identifier for the display device. The unique identifier may be any type of identifier that uniquely identifies the display device 118, such as a serial number. The client-side digital content delivery device 104 compares the received unique identifier to a set of authorized unique identifiers to determine whether the display device 118 is authorized to operate with the client-side digital content delivery device 104. For example, the client-side digital content delivery device 104 determines whether the unique identifier received from the display device 118 matches one of the authorized unique identifiers stored by the display device 118.

In the event that the client-side digital content delivery device 104 determines the that the display device 118 is authorized to operate with the client-side digital content delivery device 104, the client-side digital content delivery device 104 may cause presentation of the digital movie by the display device 118. For example, the client-side digital content delivery device 104 may stream 308 video and audio data to the display device 118, which is presented by the display device 118.

Figure 4:
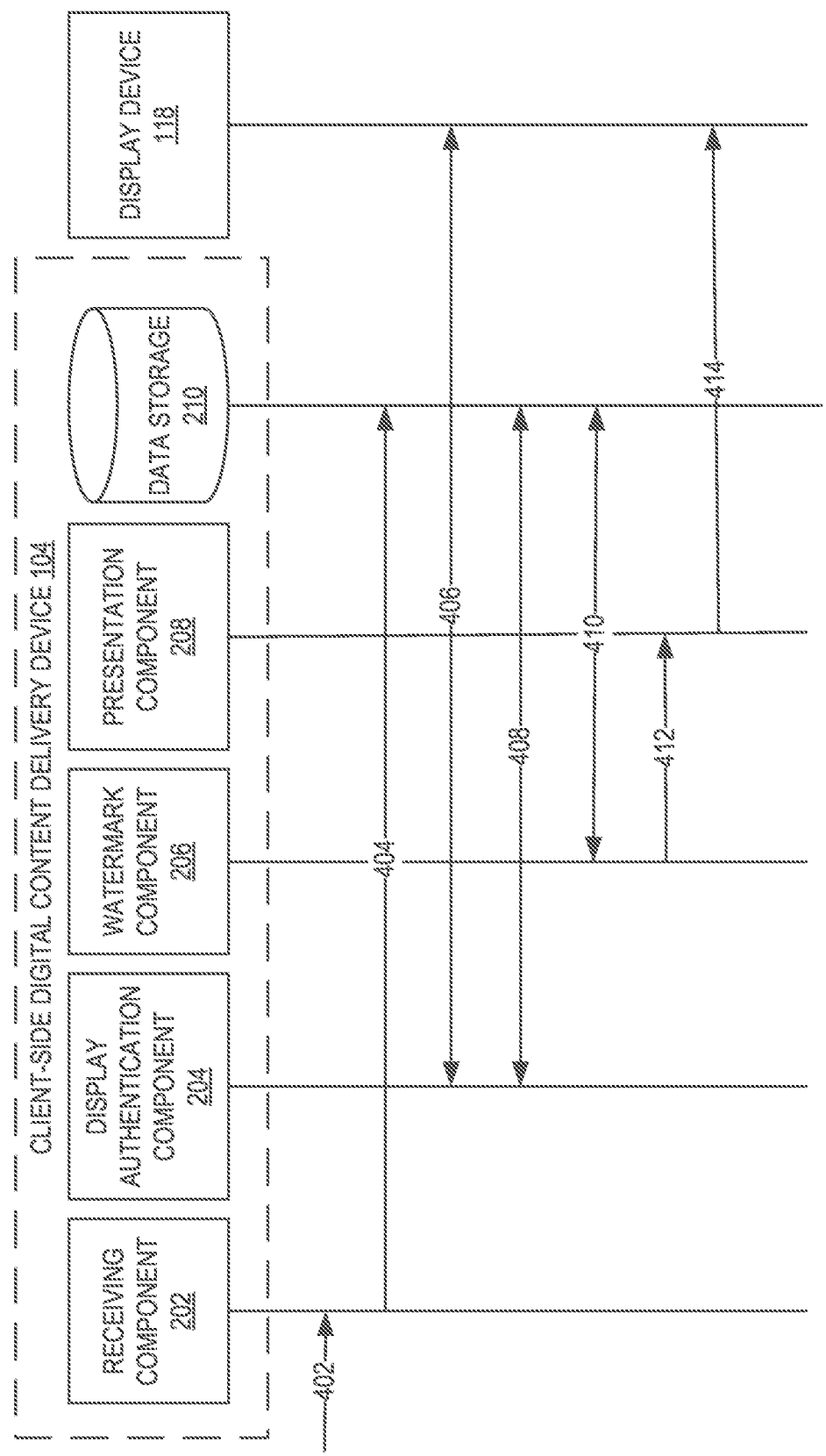
FIG. 4 shows communications within an exhibitor location for distributed DCP over internet, according to some example embodiments.

FIG. 4 shows communications within an exhibitor location for distributed DCP over internet, according to some example embodiments. As shown, the receiving component 202 of the client-side digital content delivery device 104 receives 402 a DCP. The DCP may be received from a digital content delivery system 102 via a communication network 106 such as the internet. The DCP may be encrypted and/or embedded with a digital watermark that identifies the exhibitor, exhibitor location 116, and/or the client-side digital content delivery device 104.

The receiving component 202 stores 404 the DCP in the data storage 210, where it can be accessed by the other components of the client-side digital content delivery device 104. For example, the DCP may be accessed from the data storage 210 to cause presentation of a digital movie by the display device 118. This may be performed in response to receiving a user input to cause presentation of the digital movie, such as a user using an input device (e.g., physical button, remote control, keyboard, etc.) of the client-side digital content delivery device 104 to cause presentation of the digital movie.

In response to receiving an input to present the digital movie, the display authentication component 204 communicates 406 with the display device 118 paired to the client-side digital content delivery device 104 to access a unique identifier of the display device 118. The display authentication component 204 also communicates 408 with the data storage 210 to access a set of authorized unique identifiers. The display authentication component 204 compares the unique identifier received from the display device 118 to the set of unique identifiers accessed from the data storage 210 to determine whether the display device 118 is authorized to operate with the client-side digital content delivery device 104. For example, the display authentication component 204 determines whether the unique identifier received from the display device 118 matches any of the authorized unique identifiers.

In the event that the display device 118 is authorized to operate with the client-side digital content delivery device 104, the watermark component 206 accesses 410 the DCP from the data storage 210 and applies a client-side digital watermark to a copy of the DCP. The client-side digital watermark may include session data describing the specific presentation of the digital movie, such as a day/time of the presentation, theatre, and the like.

The watermark component 206 provides 412 the copy of the DCP embedded with the client-side digital watermark to the presentation component 208. In turn, the presentation component 208 causes presentation of the digital movie by display device 118. For example, the presentation component 208 streams 414 video and audio data to the display device 118, which is then presented by the display device 118.

Figure 5:
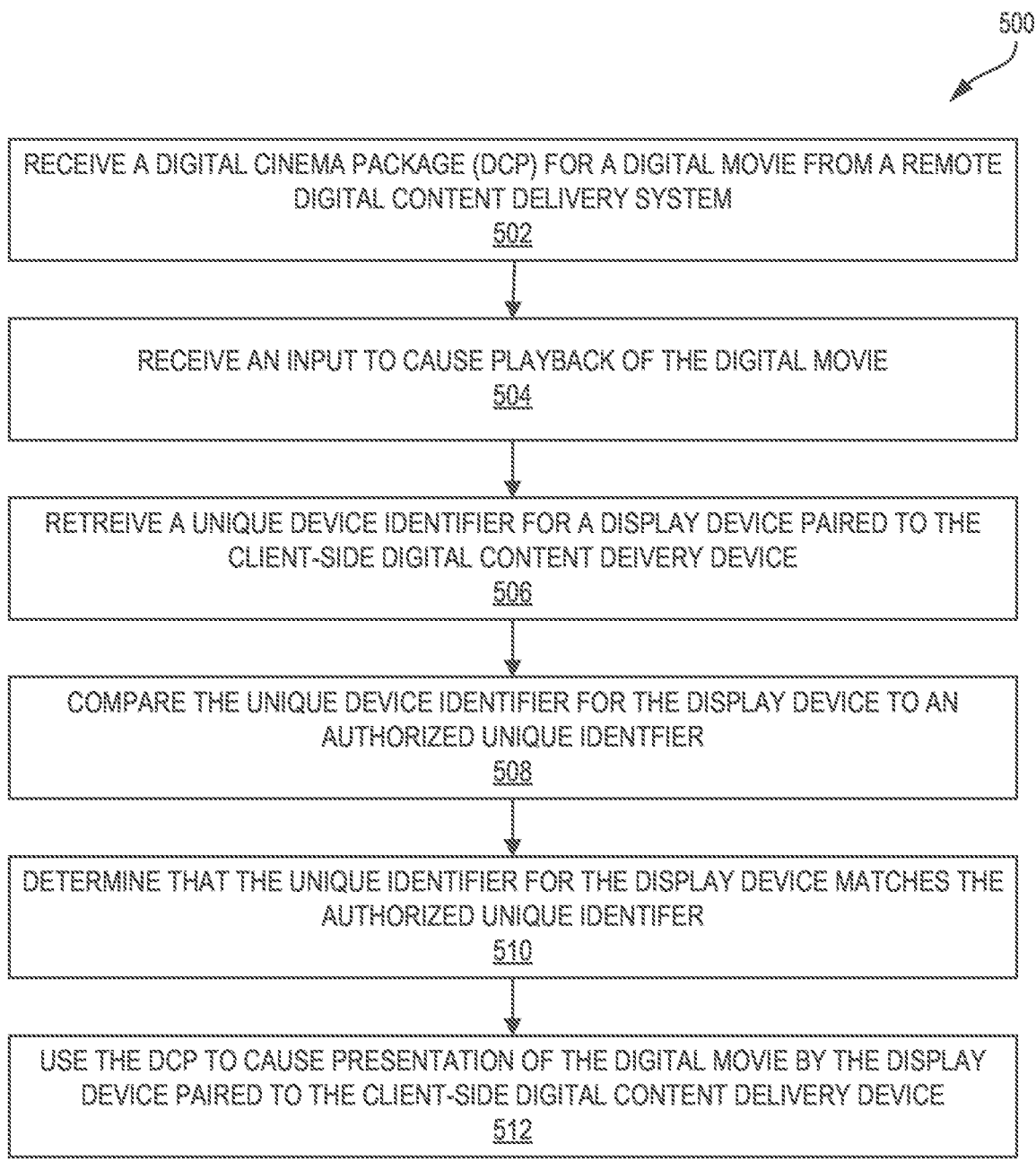
FIG. 5 is a flowchart showing a method for distributed DCP over internet, according to some example embodiments.

FIG. 5 is a flowchart showing a method 500 for distributed DCP over internet, according to some example embodiments. The method 500 may be embodied in computer readable instructions for execution by one or more processors such that the operations of the method 500 may be performed in part or in whole by the client-side digital content delivery device 104; accordingly, the method 500 is described below by way of example with reference thereto. However, it shall be appreciated that at least some of the operations of the method 500 may be deployed on various other hardware configurations and the method 500 is not intended to be limited to the client-side digital content delivery device 104.

At operation 502, the receiving component 202 receives a DCP for a digital movie from a remote digital content delivery system 102. The DCP may be received from a digital content delivery system 102 via a communication network 106 such as the internet. The DCP may be encrypted and/or embedded with a digital watermark that identifies the exhibitor, exhibitor location 116, and/or the client-side digital content delivery device 104. The receiving component 202 stores 404 the DCP in the data storage 210, where it can be accessed by the other components of the client-side digital content delivery device 104.

At operation 504, the client-side digital content delivery device 104 receives an input to cause playback of the digital movie. For example, a user may cause the input using an input device (e.g., physical button, remote control, keyboard, etc.) of the client-side digital content delivery device 104.

At operation 506, the display authentication component 204 retrieves a unique identifier for a display device 118 paired to the client-side digital content delivery device 104. For example, the display authentication component 204 communicates with the display device 118 to access the unique identifier.

The display authentication component 204 ensures that the display device 118 paired to the client-side digital content delivery device 104 is authorized to operate with the client-side digital content delivery device 104. As a security feature, each client-side digital content delivery device 104 may be restricted to use with one or more authorized display devices 118. For example, each client-side digital content delivery device 104 allocated to an exhibitor location 116 may be configured to operate with a specified set of display devices 118, such as a set of digital projectors located at the exhibitor location 116.

Accordingly, at operation 508, the display authentication component 204 compares the unique identifier for the display device 118 to an authorized unique identifier. Each client-side digital content delivery device 104 may be loaded with a set of one or more authenticated unique identifiers that identify the authorized display devices 118. For example, the authorized unique identifiers may be stored in the data storage 114. The display authentication component 204 accesses the authorized unique identifiers from the data storage 210 and compares the unique identifier for the display device 118 to the authorized unique identifiers.

If the unique identifier accessed from the paired display device 118 does not match one of the authorized unique identifiers, the display authentication component 204 determines that the display device 118 is not authorized for use with the client-side digital content delivery device 104. In this type of situation, the display authentication component 204 may prohibit the client-side digital content delivery device 104 from causing presentation of the digital movie by the display device 118.

Alternatively, if the unique identifier accessed from the paired display device 118 matches one of the authorized unique identifiers, the display authentication component 204 determines that the display device 118 is authorized for use with the client-side digital content delivery device 104.

At operation 510, the display authentication component 204 determines that the unique identifier for the display device 118 matches the authorized unique identifier. This indicates the display device 118 is authorized for use with the client-side digital content delivery device 104.

At operation 512, the presentation component 208 uses the DCP to cause presentation of the digital movie by the display device 118 paired to the client-side digital content delivery device 104. For example, the presentation component 208 streams video and audio data from the DCP to the display device 118. The display device 118 uses the received video and audio data to present the digital movie.

Figure 6:
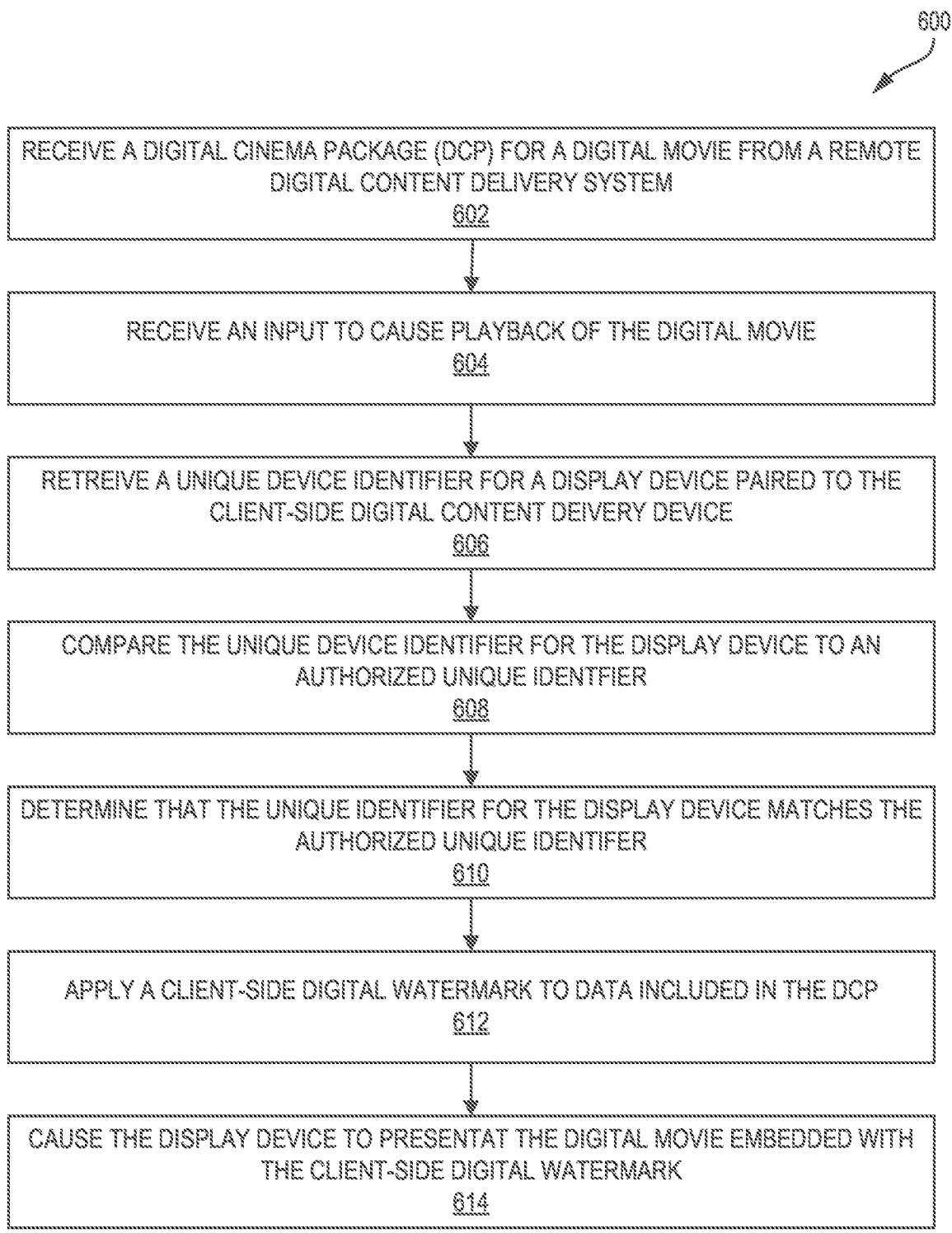
FIG. 6 is a flowchart showing a method for distributed DCP over internet, according to some example embodiments.

FIG. 6 is a flowchart showing a method 600 for distributed DCP over internet, according to some example embodiments. The method 600 may be embodied in computer readable instructions for execution by one or more processors such that the operations of the method 600 may be performed in part or in whole by the client-side digital content delivery device 104; accordingly, the method 600 is described below by way of example with reference thereto. However, it shall be appreciated that at least some of the operations of the method 600 may be deployed on various other hardware configurations and the method 600 is not intended to be limited to the client-side digital content delivery device 104.

At operation 602, the receiving component 202 receives a DCP for a digital movie from a remote digital content delivery system 102. The DCP may be received from a digital content delivery system 102 via a communication network 106 such as the internet. The DCP may be encrypted and/or embedded with a digital watermark that identifies the exhibitor, exhibitor location 116, and/or the client-side digital content delivery device 104. The receiving component 202 stores 404 the DCP in the data storage 210, where it can be accessed by the other components of the client-side digital content delivery device 104.

At operation 604, the client-side digital content delivery device 104 receives an input to cause playback of the digital movie. For example, a user may cause the input using an input device (e.g., physical button, remote control, keyboard, etc.) of the client-side digital content delivery device 104.

At operation 606, the display authentication component 204 retrieves a unique identifier for a display device 118 paired to the client-side digital content delivery device 104. For example, the display authentication component 204 communicates with the display device 118 to access the unique identifier.

The display authentication component 204 ensures that the display device 118 paired to the client-side digital content delivery device 104 is authorized to operate with the client-side digital content delivery device 104. As a security feature, each client-side digital content delivery device 104 may be restricted to use with one or more authorized display devices 118. For example, each client-side digital content delivery device 104 allocated to an exhibitor location 116 may be configured to operate with a specified set of display devices 118, such as a set of digital projectors located at the exhibitor location 116.

At operation 608, the display authentication component 204 compares the unique identifier for the display device 118 to an authorized unique identifier. Each client-side digital content delivery device 104 may be loaded with a set of one or more authenticated unique identifiers that identify the authorized display devices 118. For example, the authorized unique identifiers may be stored in the data storage 114. The display authentication component 204 accesses the authorized unique identifiers from the data storage 210 and compares the unique identifier for the display device 118 to the authorized unique identifiers.

If the unique identifier accessed from the paired display device 118 does not match one of the authorized unique identifiers, the display authentication component 204 determines that the display device 118 is not authorized for use with the client-side digital content delivery device 104. In this type of situation, the display authentication component 204 may prohibit the client-side digital content delivery device 104 from causing presentation of the digital movie by the display device 118.

Alternatively, if the unique identifier accessed from the paired display device 118 matches one of the authorized unique identifiers, the display authentication component 204 determines that the display device 118 is authorized for use with the client-side digital content delivery device 104.

At operation 610, the display authentication component 204 determines that the unique identifier for the display device 118 matches the authorized unique identifier. This indicates the display device 118 is authorized for use with the client-side digital content delivery device 104.

At operation 612, the watermark component 206 applies a client-side digital watermark to data included in the DCP. The client-side digital watermark may include session data that uniquely identifies the individual presentation of the digital movie. For example, the session data may include data identifying the day/time of presentation, the specific theatre number, and the like.

At operation 614, the presentation component 208 causes the display device 118 to present the digital movie embedded with the client-side digital watermark. For example, the presentation component 208 streams video and audio data from the DCP that was embedded with client-side digital watermark to the display device 118. The display device 118 uses the received video and audio data to present the digital movie.

Software Architecture

Figure 7:
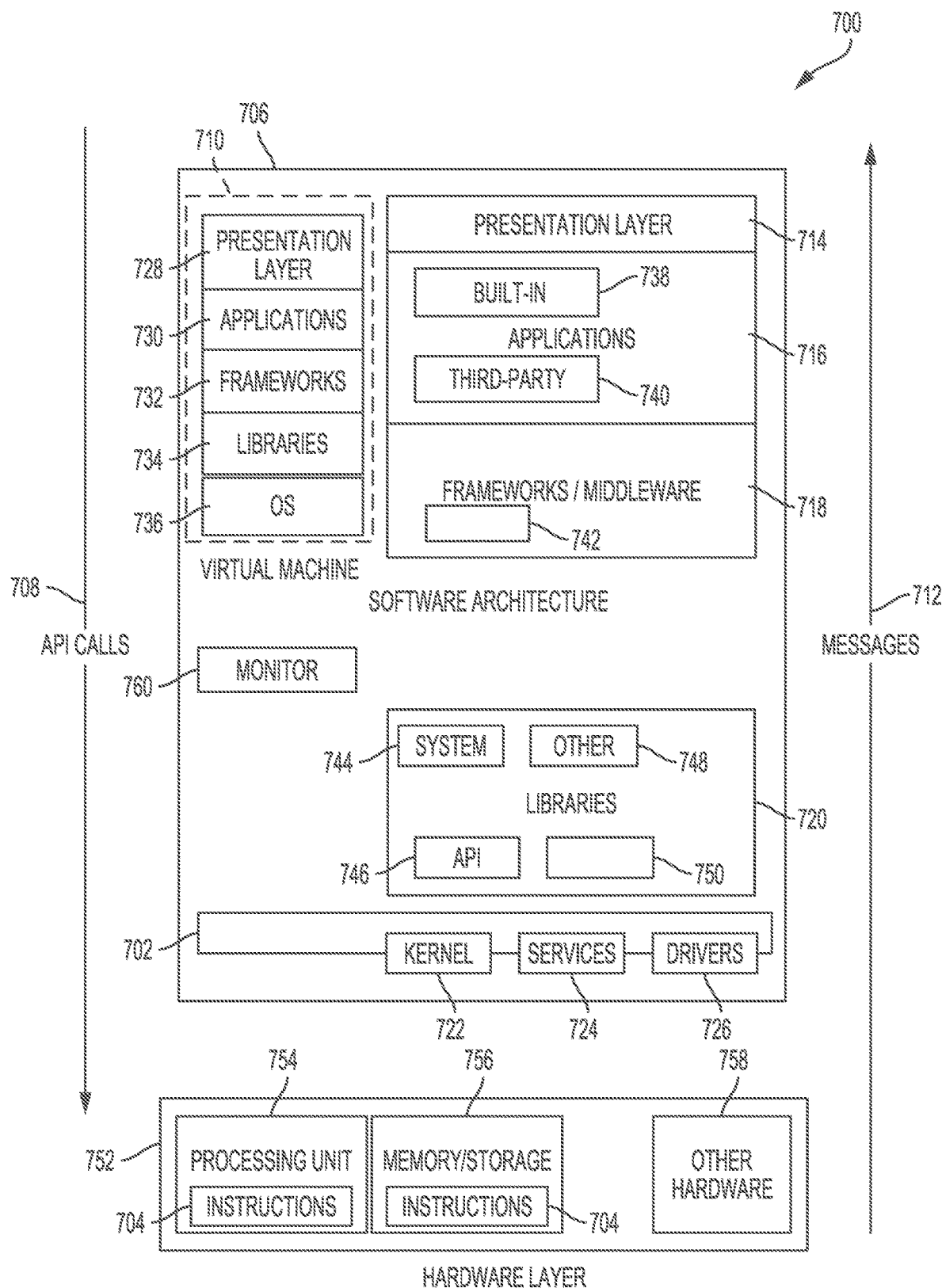
FIG. 7 is a block diagram illustrating components of a machine, according to some example embodiments, able to read instructions from a machine-readable medium (e.g., a machine-readable storage medium) and perform any one or more of the methodologies discussed herein.

FIG. 7 is a block diagram illustrating an example software architecture 706, which may be used in conjunction with various hardware architectures herein described. FIG. 7 is a non-limiting example of a software architecture 706 and it will be appreciated that many other architectures may be implemented to facilitate the functionality described herein. The software architecture 706 may execute on hardware such as machine 800 of FIG. 8 that includes, among other things, processors 804, memory 814, and (input/output) I/O components 818. A representative hardware layer 738 is illustrated and can represent, for example, the machine 800 of FIG. 8. The representative hardware layer 738 includes a processing unit 740 having associated executable instructions 704. Executable instructions 704 represent the executable instructions of the software architecture 706, including implementation of the methods, components, and so forth described herein. The hardware layer 738 also includes memory and/or storage modules 742, which also have executable instructions 704. The hardware layer 738 may also comprise other hardware 744.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke application programming interface (API) calls 708 through the software stack and receive a response such as messages 712 in response to the API calls 708. The layers illustrated are representative in nature and not all software architectures have all layers. For example, some mobile or special purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 720 provide a common infrastructure that is used by the applications 716 and/or other components and/or layers. The libraries 720 provide functionality that allows other software components to perform tasks in an easier fashion than to interface directly with the underlying operating system 702 functionality (e.g., kernel 722, services 724, and/or drivers 726). The libraries 720 may include system libraries 732 (e.g., C standard library) that may provide functions such as memory allocation functions, string manipulation functions, mathematical functions, and the like. In addition, the libraries 720 may include API libraries 734 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 720 may also include a wide variety of other libraries 736 to provide many other APIs to the applications 716 and other software components/modules.

The frameworks/middleware 718 (also sometimes referred to as middleware) provide a higher-level common infrastructure that may be used by the applications 716 and/or other software components/modules. For example, the frameworks/middleware 718 may provide various graphical user interface (GUI) functions, high-level resource management, high-level location services, and so forth. The frameworks/middleware 718 may provide a broad spectrum of other APIs that may be used by the applications 716 and/or other software components/modules, some of which may be specific to a particular operating system 702 or platform.

The applications 716 include built-in applications 728 and/or third-party applications 730. Examples of representative built-in applications 728 may include, but are not limited to, a contacts application, a browser application, a book reader application, a location application, a media application, a messaging application, and/or a game application. Third-party applications 730 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 730 may invoke the API calls 708 provided by the mobile operating system (such as operating system 702) to facilitate functionality described herein.

The applications 716 may use built in operating system functions (e.g., kernel 722, services 724, and/or drivers 726), libraries 720, and frameworks/middleware 718 to create UIs to interact with users of the system. Alternatively, or additionally, in some systems, interactions with a user may occur through a presentation layer, such as presentation layer 714. In these systems, the application/component "logic" can be separated from the aspects of the application/component that interact with a user.

Figure 8:
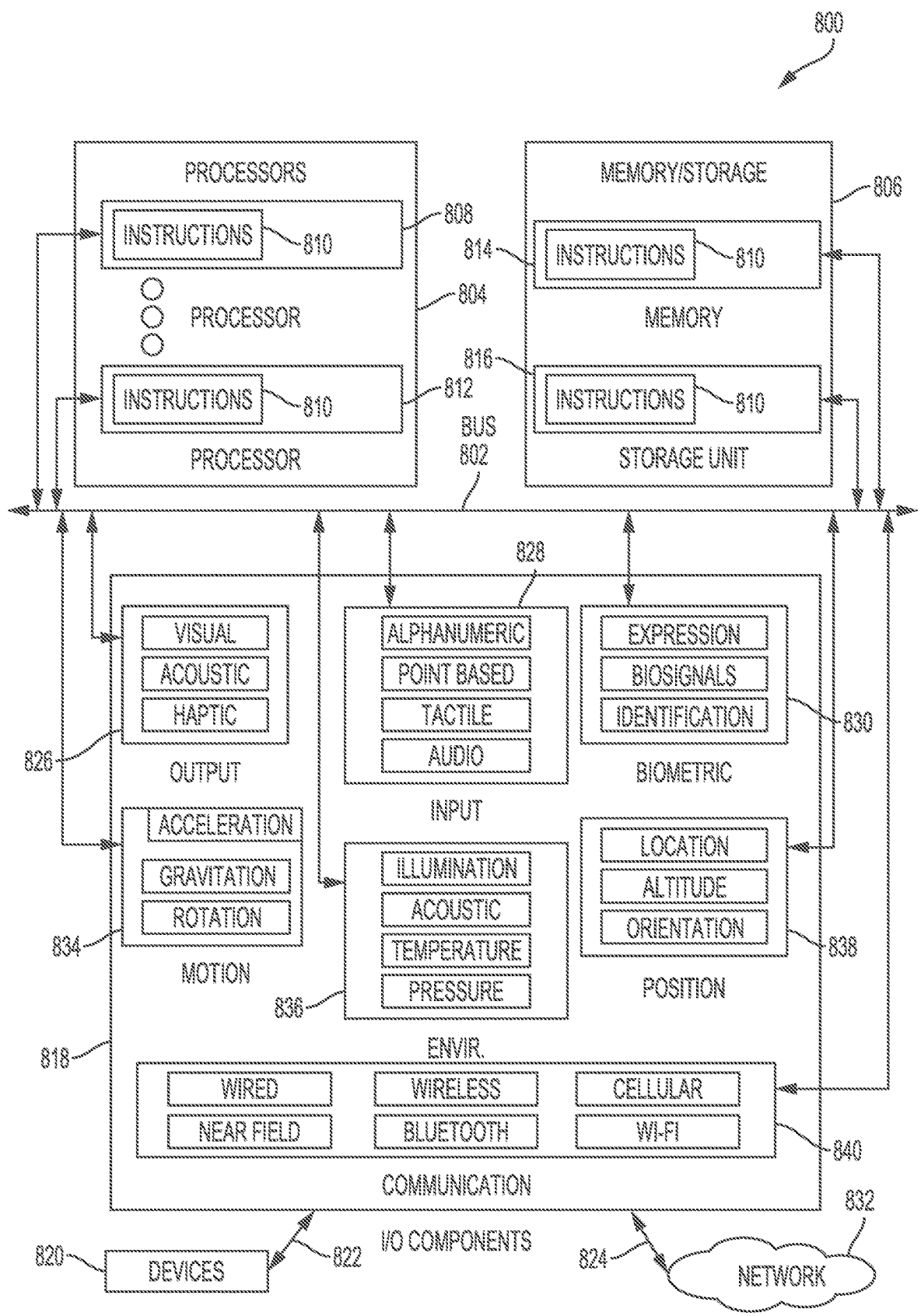
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions 704 from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 800 capable of executing the instructions 810, sequentially or otherwise, that specify actions to be taken by machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of processors 804 are examples of machine-readable media.

The I/O components 818 may include a wide variety of components to receive input, provide output, produce output, transmit information, exchange information, capture measurements, and so on. The specific I/O components 818 that are included in a particular machine 800 will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion and the grouping is in no way limiting. In various example embodiments, the I/O components 818 may include output components 826 and input components 828. The output components 826 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environmental components 836, or position components 838 among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 834 may include acceleration sensor components (e.g., accelerometer), gravitation sensor components, rotation sensor components (e.g., gyroscope), and so forth. The environmental components 836 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 838 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via coupling 824 and coupling 822, respectively. For example, the communication components 840 may include a network interface component or other suitable device to interface with the network 832. In further examples, communication components 840 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840 such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 810 for execution by the machine 800, and includes digital or analog communications signals or other intangible medium to facilitate communication of such instructions 810. Instructions 810 may be transmitted or received over the network 832 using a transmission medium via a network interface device and using any one of a number of well-known transfer protocols.

"CLIENT DEVICE" in this context refers to any machine 800 that interfaces to a communications network 832 to obtain resources from one or more server systems or other client devices. A client device may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 832.

"COMMUNICATIONS NETWORK" in this context refers to one or more portions of a network 832 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 832 or a portion of a network 832 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 810 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 810. The term "machine-readable medium" shall also be taken to include any medium, or combination of multiple media, that is capable of storing instructions 810 (e.g., code) for execution by a machine 800, such that the instructions 810, when executed by one or more processors 804 of the machine 800, cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 804) may be configured by software (e.g., an application 716 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 804 or other programmable processor 804. Once configured by such software, hardware components become specific machines 800 (or specific components of a machine 800) uniquely tailored to perform the configured functions and are no longer general-purpose processors 804. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 804 configured by software to become a special-purpose processor, the general-purpose processor 804 may be configured as respectively different special-purpose processors (e.g., comprising different hardware components) at different times. Software accordingly configures a particular processor or processors 804, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 802) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 804 that are temporarily configured (e.g., by software) or permanently configured to perform the relevant operations. Whether temporarily or permanently configured, such processors 804 may constitute processor-implemented components that operate to perform one or more operations or functions described herein. As used herein, "processor-implemented component" refers to a hardware component implemented using one or more processors 804. Similarly, the methods described herein may be at least partially processor-implemented, with a particular processor or processors 804 being an example of hardware. For example, at least some of the operations of a method may be performed by one or more processors 804 or processor-implemented components. Moreover, the one or more processors 804 may also operate to support performance of the relevant operations in a "cloud computing" environment or as a "software as a service" (SaaS). For example, at least some of the operations may be performed by a group of computers (as examples of machines 800 including processors 804), with these operations being accessible via a network 832 (e.g., the Internet) and via one or more appropriate interfaces (e.g., an API). The performance of certain of the operations may be distributed among the processors 804, not only residing within a single machine 800, but deployed across a number of machines 800. In some example embodiments, the processors 804 or processor-implemented components may be located in a single geographic location (e.g., within a home environment, an office environment, or a server farm). In other example embodiments, the processors 804 or processor-implemented components may be distributed across a number of geographic locations.

"PROCESSOR" in this context refers to any circuit or virtual circuit (a physical circuit emulated by logic executing on an actual processor 804) that manipulates data values according to control signals (e.g., "commands," "op codes," "machine code," etc.) and which produces corresponding output signals that are applied to operate a machine 800. A processor 804 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor 804 may further be a multi-core processor having two or more independent processors 804 (sometimes referred to as "cores") that may execute instructions 810 contemporaneously.

What is claimed is:
1. A method comprising:
receiving, by a client-side digital content delivery device, an encrypted digital cinema package (DCP) for a digital movie, the encrypted DCP received from a digital content delivery system that is remote to the client-side digital content delivery device, the encrypted DCP including a first persistent unique digital watermark antecedently applied to the encrypted DCP by the digital content delivery system;
receiving from the digital content delivery system, a first authenticated unique identifier antecedently loaded onto the digital content delivery system, the first authenticated unique identifier corresponding with a first display device paired to the client-side digital content delivery device;
receiving, by the client-side digital content delivery device, a first Key Delivery Message (KDM) corresponding with the encrypted DCP and the first display device paired to the client-side digital content delivery device, the first KDM including a key for decrypting the encrypted DCP;

accessing a unique device identifier corresponding with the first display device, including comparing the unique device identifier with the first authenticated unique identifier;

decrypting, based on the comparison of the unique device identifier with the first authenticated unique identifier and by the client-side digital content delivery device, the encrypted DCP using the key included in the first KDM; and using the decrypted DCP to cause presentation of the digital movie according to the first KDM and by the first display device paired to the client-side digital content delivery device, wherein using the decrypted DCP to cause presentation of the digital movie by the display device comprises:

applying a client-side digital watermark to data included in the DCP, yielding watermarked presentation data, the client-side digital watermark including first session data associated with the presentation of the DCP; and transmitting the watermarked presentation data to the display device.

2. The method of claim 1, wherein the DCP is received from the digital content delivery system via a communications network including at least one of an intranet, an extranet, a virtual private network (VPN), a local area network (LAN), a wide area network (WAN), or a cellular telephone network.

3. The method of claim 1, wherein the DCP is received from the digital content delivery system using an internet protocol.

4. The method of claim 1, wherein the client-side digital content delivery device is communicatively coupled, via a physical connector, to the first display device.

5. The method of claim 2, wherein the client-side digital watermark comprises session data associated with the presentation of the DCP.

6. The method of claim 1, wherein the DCP is received from the digital content delivery system using an internet protocol.

7. A client-side digital content delivery device comprising:

one or more computer processors; and one or more computer-readable mediums storing instructions that, when executed by the one or more computer processors, cause the one or more computer processors to perform operations comprising:

receiving, by a client-side digital content delivery device, an encrypted digital cinema package (DCP) for a digital movie, the encrypted DCP received from a digital content delivery system that is remote to the client-side digital content delivery device, the encrypted DCP including a first persistent unique digital watermark antecedently applied to the encrypted DCP by the digital content delivery system;

receiving from the digital content delivery system, a first authenticated unique identifier antecedently loaded onto the digital content delivery system, the first authenticated unique identifier corresponding with a first display device paired to the client-side digital content delivery device;

receiving, by the client-side digital content delivery device, a first Key Delivery Message (KDM) corresponding with the encrypted DCP and the first display device paired to the client-side digital content delivery device, the first KDM including a key for decrypting the encrypted DCP;

accessing a unique device identifier corresponding with the first display device, including comparing the unique device identifier with the first authenticated unique identifier;

decrypting, based on the comparison of the unique device identifier with the first authenticated unique identifier and by the client-side digital content delivery device, the encrypted DCP using the key included in the first KDM; and using the decrypted DCP to cause presentation of the digital movie according to the first KDM and by the first display device paired to the client-side digital content delivery device, wherein using the decrypted DCP to cause presentation of the digital movie by the display device comprises:

applying a client-side digital watermark to data included in the DCP, yielding watermarked presentation data, the client-side digital watermark including first session data associated with the presentation of the DCP; and transmitting the watermarked presentation data to the display device.

8. The client-side digital content delivery device of claim 7, wherein the DCP is received from the digital content delivery system via a communications network including at least one of an intranet, an extranet, a virtual private network (VPN), a local area network (LAN), a wide area network (WAN), or a cellular telephone network.

9. The client-side digital content delivery device of claim 7, wherein the DCP is received from the digital content delivery system using an internet protocol.

10. The client-side digital content delivery device of claim 7, wherein the client-side digital content delivery device is communicatively coupled, via a physical connector, to the first display device.

11. The client-side digital content delivery device of claim 7, wherein the client-side digital watermark comprises session data associated with the presentation of the DCP.

12. The client-side digital content delivery device of claim 7, wherein the DCP is received from the digital content delivery system using an internet protocol.

* * * * *